US008154740B2

(12) United States Patent  
Okada et al.

(10) Patent No.: US 8,154,740 B2  
(45) Date of Patent: Apr. 10, 2012

(54) IMAGE PROCESSING APPARATUS FOR CONCATENATING A READ DOCUMENT IMAGE, METHOD OF GENERATING AN INDEX OF A CONCATENATED IMAGE, AND COMPUTER-READABLE RECORDING MEDIUM HAVING INDEX GENERATION PROGRAM RECORDED

(75) Inventors: Takuya Okada, Toyokawa (JP); Shoji Imaizumi, Shinshiro (JP); Mie Kawabata, Toyokawa (JP); Masayuki Ito, Nagoya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 278 days.

(21) Appl. No.: 12/561,443

(22) Filed: Sep. 17, 2009

(65) Prior Publication Data

US 2010/0073701 A1 Mar. 25, 2010

(30) Foreign Application Priority Data

Sep. 19, 2008 (JP) ................................. 2008-240231

(51) Int. Cl.
 *G06F 3/12* (2006.01)
 *G06K 15/00* (2006.01)
(52) U.S. Cl. ...................................... 358/1.13; 358/1.15
(58) Field of Classification Search .................... 358/1.1, 358/1.9, 1.13, 1.14, 1.15, 1.18, 402, 468; 707/723, 776; 715/501.1
See application file for complete search history.

(56) References Cited

U.S. PATENT DOCUMENTS

| | | | | |
|---|---|---|---|---|
| 6,029,182 | A * | 2/2000 | Nehab et al. | 715/205 |
| 6,725,260 | B1 * | 4/2004 | Philyaw | 709/220 |
| 6,931,439 | B1 * | 8/2005 | Hanmann et al. | 709/219 |
| 7,142,318 | B2 * | 11/2006 | Lopez et al. | 358/1.15 |
| 7,159,014 | B2 * | 1/2007 | Kausik et al. | 709/217 |
| 7,444,597 | B2 * | 10/2008 | Perantatos et al. | 715/769 |
| 7,739,253 | B1 * | 6/2010 | Yanovsky et al. | 707/705 |
| 8,014,011 | B2 * | 9/2011 | Kim | 358/1.15 |
| 2001/0018698 | A1 | 8/2001 | Uchino et al. | |
| 2005/0188051 | A1 * | 8/2005 | Sneh | 709/213 |
| 2008/0259383 | A1 | 10/2008 | Fukami | |

FOREIGN PATENT DOCUMENTS

| | | |
|---|---|---|
| JP | 11-143912 | 5/1999 |
| JP | 2000-307777 A | 11/2000 |
| JP | 2001-155021 | 6/2001 |
| JP | 2003-132042 A | 5/2003 |
| JP | 2005-027067 | 1/2005 |
| JP | 2007-159068 | 6/2007 |
| JP | 2008-187599 | 8/2008 |

OTHER PUBLICATIONS

Notice of Grounds of Rejection dated Aug. 3, 2010, issued in the corresponding Japanese Patent Application No. 2008-240231, and an English Translation thereof.

* cited by examiner

*Primary Examiner* — Gabriel Garcia

(74) *Attorney, Agent, or Firm* — Buchanan Ingersoll & Rooney PC

(57) ABSTRACT

An image processing apparatus includes a scanner for reading out documents, a first extraction unit for extracting text contained in document images, a second extraction unit for extracting at least one Web address from the text, a fetch unit for obtaining at least one Web page corresponding to the Web address, a first generation unit for generating a concatenated image by concatenating the document images with the Web page, and a second generation unit for generating an index indicating a corresponding relationship between the document images and the Web page in the concatenated image.

22 Claims, 14 Drawing Sheets

DOCUMENT PAGE 1

DOCUMENT PAGE 2

DOCUMENT PAGE 3

FIG.6

```
DOCUMENT PAGE 1···PAGE 2(RED)
DOCUMENT PAGE 2···PAGE 3(GREEN)
DOCUMENT PAGE 3···PAGE 4(BLUE)
Web PAGE 1-1···PAGE 5(RED)
Web PAGE 2-1···PAGE 8(GREEN)
Web PAGE 2-2···PAGE 9(GREEN)
```
~138(104B)

FIG.7

```
★DOCUMENT PAGE 1···PAGE 2
■DOCUMENT PAGE 2···PAGE 3
○DOCUMENT PAGE 3···PAGE 4
★Web PAGE 1-1···PAGE 5
■Web PAGE 2-1···PAGE 8
■Web PAGE 2-2···PAGE 9
```
~138(104B)

FIG.13

EXAMPLE 1···PAGE 2(RED)
SECOND EMBODIMENT···PAGE 3(GREEN)
TEST 3···PAGE 4(BLUE)
Web PAGE INFORMATION ENTITY 1-1···PAGE 5(RED)
Web TITLE 2-1···PAGE 8(GREEN)
Web TITLE 2-2···PAGE 9(GREEN)

138(104B)

US 8,154,740 B2

IMAGE PROCESSING APPARATUS FOR CONCATENATING A READ DOCUMENT IMAGE, METHOD OF GENERATING AN INDEX OF A CONCATENATED IMAGE, AND COMPUTER-READABLE RECORDING MEDIUM HAVING INDEX GENERATION PROGRAM RECORDED

This application is based on Japanese Patent Application No. 2008-240231 filed with the Japan Patent Office on Sep. 19, 2008, the entire content of which is hereby incorporated by reference.

BACKGROUND OF THE INVENTION

1. Field of the Invention

The present invention relates to an image processing apparatus having a Web browser function, an index generation method for the image processing apparatus, and a computer-readable recording medium on which is recorded an index generation program to be executed at the image processing apparatus. More particularly, the present invention relates to an image processing apparatus concatenating a read document image with an obtained Web page and then generating an index of the concatenated image, an index generation method for the image processing apparatus, and a computer-readable recording medium on which is recorded an index generation program to be executed at the image processing apparatus.

2. Description of the Related Art

An image formation apparatus (image processing apparatus) reading out and providing a copy of a document is known. Some image formation apparatuses can obtain a Web page from an external source through a network by using a Web browser. Various techniques are proposed to output a read document and/or obtained Web page.

For example, Japanese Laid-Open Patent Publication No. 2003-132042 discloses an index generation apparatus. According to this publication, a scanner in a copy machine reads out a document to obtain a document image. A marking recognition unit recognizes any marked data, if present, indicating that a marking has been applied into a document by the user in the document image. An operation unit can display the under-mark data recognized by the marking recognition unit and receive a selected designation of those to be used as a title in an index by the user. An index organization unit generates index data based on under-mark data that is used for a title in an index. An image processor outputs index data or copy data of a document as the print data in a predetermined format. A printer unit outputs the print data in the form of a printed work.

Japanese Laid-Open Patent Publication No. 2000-307777 discloses a digital copy device. According to this publication, an instruction to append link information indicating that, when Text 1, Text 2 and Text 3 generated by a computer and an image A scanned by the digital copy device are to be printed in the order of Text 1, Text 2, Image A, and Text 3, and all are to be bound together by a staple, each data thereof constitutes one job, is provided. Then, to a printer controller are transferred Text 1, Text 2 and Text 3 from the computer, and image A from the digital copy machine. The printer controller stores each data with the appended link information in a memory device, and conducts printing sequentially from the digital copy machine. When the printing operation of the text is completed, the staple mechanism at a finishing unit is operated to allow the printed sheets to be bound together by a staple.

Recently, there are many documents with a Web address for citation/reference defined therein. In order to view the content of a Web page whose Web address appears on a document, the user must enter the address additionally upon activating the Web browser. Namely, the user has to take the trouble to enter the address.

Moreover, even if the user fetches a Web page corresponding to a Web address cited on a document, there is a disadvantage that the corresponding relationship between a document image and a Web page is not easily discernible. In other words, after the user fetches or stores a Web page, there may be the case where the user cannot identify which Web page corresponds to a Web address set forth in a document.

SUMMARY OF THE INVENTION

In view of the foregoing, an object of the present invention is to provide an image processing apparatus that allows a user to identify the corresponding relationship between a document image and a down-loaded Web page, an index generation method for the image processing apparatus, and a computer-readable recording medium having an index generation program recorded for execution at the image processing apparatus.

According to an aspect of the present invention, an image processing apparatus includes a scanner for obtaining document images by reading out documents, respectively, a first extraction unit for extracting text contained in the document images, a second extraction unit for extracting at least one Web address from the text, a fetch unit for obtaining at least one Web page corresponding to the Web address through a network by utilizing a Web browser, a first generation unit for generating a concatenated image by concatenating the document images with the Web page, and a second generation unit for generating an index indicating a corresponding relationship between the document images and the Web page in the concatenated image.

Preferably, the index includes items corresponding to the document images, and at least one item corresponding to the Web page.

Preferably, the second generation unit includes a grouping unit for classifying the Web page into one of groups corresponding to the document images, and an append unit for appending information indicating the corresponding group to each item included in the index.

Preferably, a predetermined color is set for each group. The image processing apparatus further includes an output unit for applying the color of the corresponding group to each item included in the index, and providing an output of the index with the applied color.

Preferably, a predetermined mark is set for each group. The image processing apparatus further includes an output unit for applying the mark of the corresponding group to each item included in the index, and providing an output of the index with the applied mark.

Preferably, a predetermined color is set for each group. The append unit associates the predetermined color, in the information, with each item included in the index.

Preferably, a predetermined mark is set for each group. The append unit associates the predetermined mark, in the information, with each item included in the index.

Preferably, the second generation unit generates the index to allow the items to be sorted based on the groups.

Preferably, the image processing apparatus further includes a third extraction unit for extracting a heading of each document. The append unit appends the heading of each document to the item of the corresponding document image as a name of the corresponding document image.

Preferably, the append unit appends each Web address to the item of the corresponding Web page as a name of the corresponding Web page.

Preferably, the image processing apparatus further includes a printer for printing out the concatenated image or the index.

Another aspect of the present invention is directed to an index generation method for an image processing apparatus that includes a controller and a scanner, and that allows usage of a Web browser. The index generation method includes the steps of: causing the scanner to obtain document images by reading out documents, respectively, by the controller; extracting text contained in the document images, by the controller; extracting at least one Web address from the text, by the controller; obtaining at least one Web page corresponding to the Web address through a network by using the Web browser, by the controller; generating a concatenated image by concatenating the document images with the Web page, by the controller; and generating an index indicating a corresponding relationship between the document images and the Web page in the concatenated image, by the controller.

Preferably, the index includes items corresponding to the document images, and at least one item corresponding to the Web page.

Preferably, the step of generating the index includes the steps of classifying the Web page into one of groups corresponding to the document images, by the controller, and appending information indicating the corresponding group to each item included in the index by the controller.

Preferably, a predetermined color is set for each group. The index generation method further includes the step of applying the color of the corresponding group to each item included in the index, and providing an output of the index with the applied color, by the controller.

Preferably, a predetermined mark is set for each group. The index generation method further includes the step of applying the mark of the corresponding group to each item included in the index, and providing an output of the index with the applied mark, by the controller.

Preferably, a predetermined color is set for each group. The step of appending information includes the step of associating the predetermined color, in the information, with each item included in the index, by the controller.

Preferably, a predetermined mark is set for each group. The step of appending information includes the step of associating the predetermined mark, in the information, with each item included in the index, by the controller.

Preferably, the step of generating the index includes the step of generating the index to allow the items to be sorted based on the groups, by the controller.

Preferably, the index generation method further includes the step of extracting a heading of each document, by the controller. The step of appending information includes the step of appending the heading of each document to the item of the corresponding document image as a name of the corresponding document image, by the controller.

Preferably, the step of appending information includes the step of appending each Web address to the item of the corresponding Web page as a name of the corresponding Web page, by the controller.

Preferably, the image processing apparatus includes a printer. The index generation method further includes the step of causing the printer to print out the concatenated image or the index, by the controller.

A further aspect of the present invention is directed to a computer-readable recording medium having an index generation program recorded to cause an image processing apparatus including a controller and the scanner, and allowing usage of a Web browser, to generate an index. The index generation program causes the controller to execute the steps of: causing the scanner to obtain document images by reading out documents, respectively, extracting text contained in the document images; extracting at least one Web address from the text; obtaining at least one Web page corresponding to the Web address through a network by using the Web browser; generating a concatenated image by concatenating the document images with the Web page; and generating an index indicating a corresponding relationship between the document images and the Web page in the concatenated image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 represents an image of a display of an index generated by a second generation unit.

FIG. 7 represents an image of a modified example of a display of an index generated by the second generation unit.

FIG. 13 represents an image of a display of a modified example of a pre-sort index, generated by the second generation unit.

DESCRIPTION OF THE PREFERRED EMBODIMENTS

Figure 1:
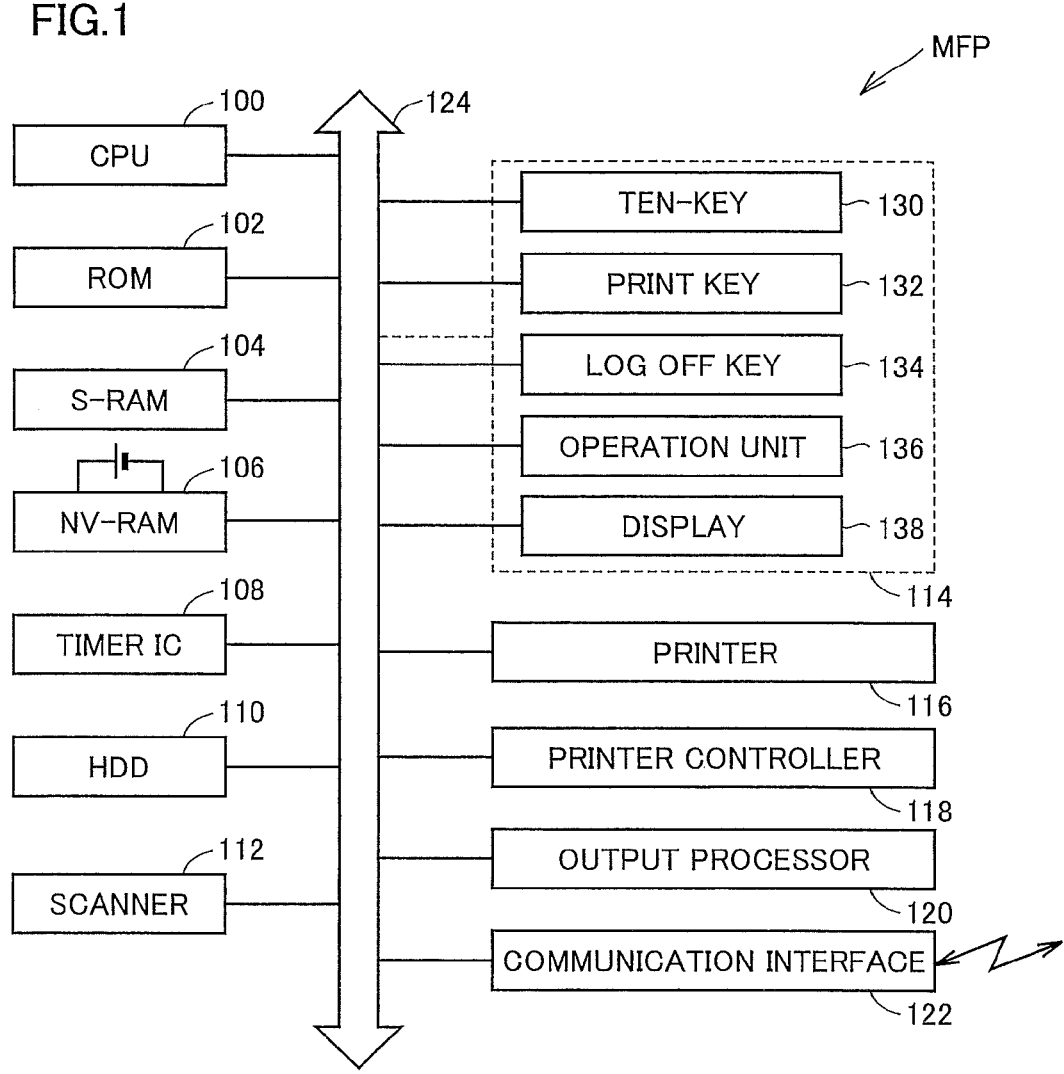
FIG. 1 is a schematic diagram of a hardware configuration of an image formation apparatus MFP (Multi Function Peripheral) according to an embodiment.

Embodiments of the present invention will be described hereinafter with reference to the drawings. The same components have the same reference characters allotted in the description, Their designation and function are also identical. Therefore, detailed description will not be repeated.

<Hardware Configuration of Image Formation Apparatus MFP>

An image formation apparatus (image processing apparatus) MFP according to the present embodiment typically is an MFP (Multi Function Peripheral) incorporating a plurality of functions such as a copy function, a facsimile function, and a scanner function.

First, a hardware configuration of image formation apparatus MFP of the present embodiment will be described.

Referring to FIG. 1, an image formation apparatus MFP includes a CPU (Central Processing Unit) 100, a ROM (Read Only Memory) 102, an S-RAM (Static Random Access Memory) 104, an NV-RAM (Non-Volatile Random Access Memory) 106, and a timer IC (Integrated Circuit) 108. These elements are connected to each other via a bus 124.

CPU 100 realizes an index generation process according to the present embodiment by reading out a program that is prestored in ROM 102 and the like into S-RAM 104 qualified as a working memory, and executing the program. For example, CPU 100 uses a Web browser read out into S-RAM 104 to fetch a Web page from an external source. Specifically, CPU 100 causes a communication interface 122 to receive a Web page from an external Web server or the like through a network.

NV-RAM 106 stores in a non-volatile manner various settings in association with image formation at image formation apparatus MFP, Timer IC 108 is formed including a crystal oscillator and the like to measure the current time.

Image formation apparatus MFP further includes a scanner 112, an operation panel 114, a printer 116, a printer controller 118, and an output processor 120.

Scanner 112 is an element to read out a document, and includes an image sensor such as a CCD (Charged Coupled Device), a slider control device, various image processing control circuits, and the like (all not shown). Scanner 112 reads out a document to generate a document image. Scanner 112 includes a tray on which a document is set, a platen glass, a feeder automatically feeding a document set on the tray to the platen glass one by one, and a discharge bed where a scanned document is output (all not shown).

Operation panel 114 includes a ten-key 130, a PRINT key 132, a log off key 134, an operation unit 136, and a display 138, Operation panel 114 is disposed at the surface region of image formation apparatus MFP. Ten-key 130, PRINT key 132, log off key 134 and operation unit 136 function as an input unit in entirety, accepting an operation made by the user.

Operation unit 136 is formed of, for example, a transparent touch panel. Operation unit 136 accepts the address of a Web page from the user when a Web page is to be downloaded to image formation apparatus MFP. The address accepted at operation unit 136 is temporarily stored at S-RAM 104.

Display 138 provides a screen to prompt the user to set or select various items. Display 138 typically includes an LCD (Liquid Crystal Display). Operation unit 136 is arranged at the surface of display 138. Display 138 shows a downloaded Web page.

Printer 116 conducts printing of an image to a sheet medium. Printer 116 typically includes an exposure device and a development roller constituting an image formation unit, a transfer roller transferring the toner image formed by the image formation unit onto a sheet medium, a fixer for fixing the transferred toner image, a control circuit controlling the operation of each element, and the like.

Printer controller 118 converts the print data from a Web server SRV or from a personal computer (for example, a Web page), and/or a document image (image data) read out by scanner 112 into data suitable for printing at printer 116. In the case where image formation apparatus MFP is typically a color type apparatus, printer controller 118 converts the print data (Web page) and other image data into raster data of the four colors of yellow (Y), magenta (M), cyan (C) and black (K) to provide the raster data of each color to printer 116.

Specifically, at image formation apparatus MFP of the present embodiment, printer controller 118 generates printer data corresponding to a document image, a Web page, a concatenated image, an index, or the like, based on image data or text data representing a document image, a Web page, a concatenated image, an index, or the like output from CPU 100. Then, printer 116 prints out (image formation) a document image, a Web page, a concatenated image, an index or the like onto a sheet medium based on the printer data corresponding to the document image, Web page, concatenated image, index, or the like output from printer controller 118.

Output processor 120 carries out processing on a sheet medium subsequent to image formation by printer 116. Output processor 120 typically executes a "sorting process", "grouping process", "stapling process", "punching process" and the like. "Sorting process" refers to the process of, when a document including a plurality of pages is to be output for a plurality of circulations, sheet media on which images are formed according to the pagination identical to that of the relevant document are output by the exact number of circulations set, i.e. the so-called collating printing. "Grouping process" refers to the process in which the sheet media of a plurality of circulations set are output for every pages of the relevant document. "Stapling process" refers to the process in which the output paper sheets are bound together by a staple. "Punching process" refers to the process of forming a hole in the output sheets for binding the sheet media.

Image formation apparatus MFP further includes a hard disk (HDD: Hard Disk Drive) 110, and a communication interface (network interface) 122.

Hard disk 110 is a storage unit storing data of a relative large amount in a non-volatile manner. A Web page from Web server SRV, a document image read out by scanner 112, and the like are stored in hard disk 110.

Communication interface 122 serves to establish data communication with a personal computer and/or Web server via a network. For example, communication interface 122 responds to a data request instruction including a Web address from CPU 100 to receive a Web page from a Web server through the network.

By the configuration set forth above, CPU 100 causes a Web page downloaded through access to a designated address of a Web server to be provided on display 138 at operation panel 114. Based on a user-input instruction accepted through operation unit 136 at operation panel 114, CPU 100 carries out switching of a Web page (downloading a new Web page), scrolling a Web page on display 138, and the like.

<Function Configuration of Image Formation Apparatus MFP>

The function of image formation apparatus MFP according to the present embodiment will be described hereinafter based on the block diagram of FIG. 2.

Figure 2:
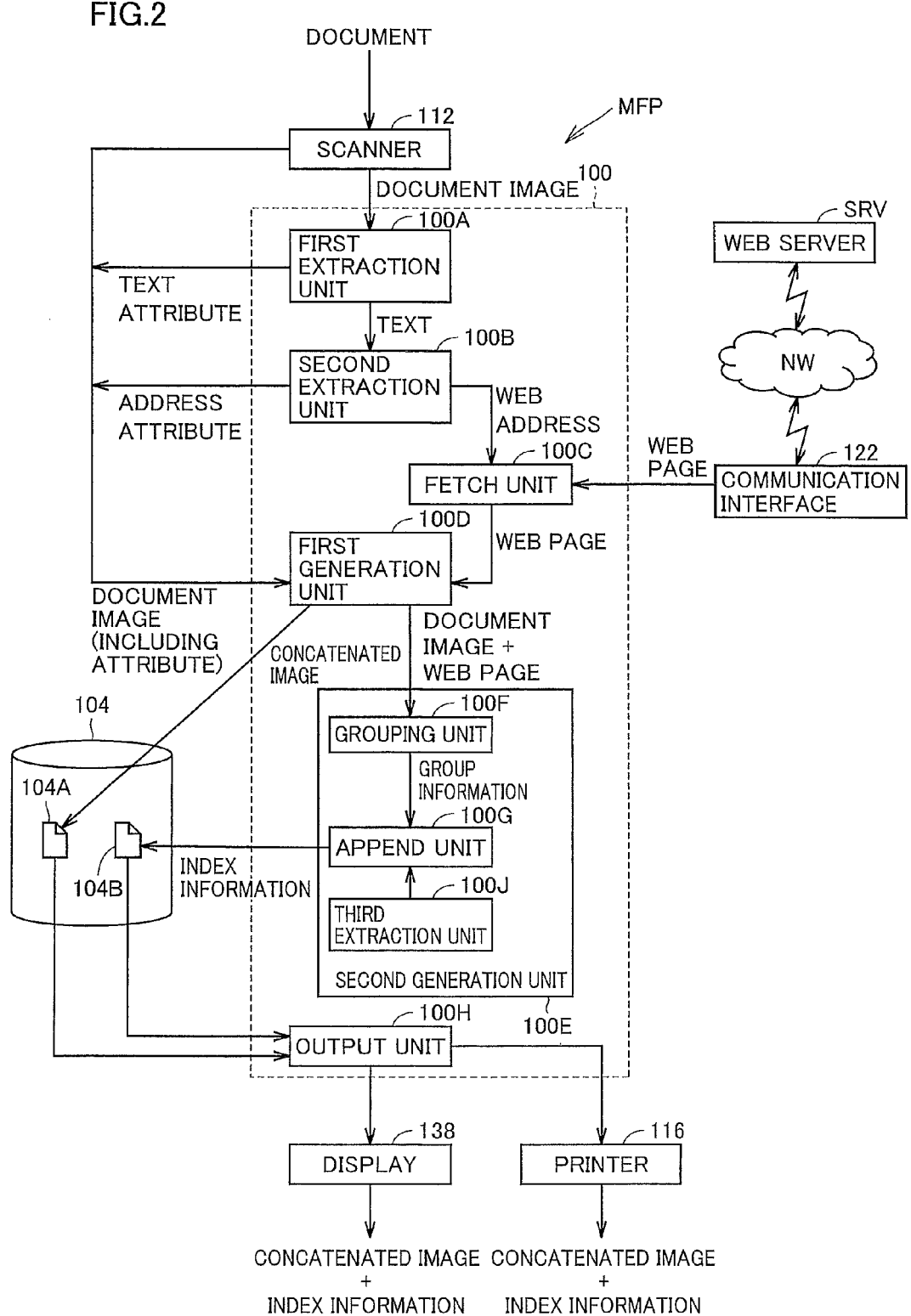
FIG. 2 is a block diagram of a function configuration of an image formation apparatus MFP according to an embodiment.

Referring to FIG. 2, a Web server SRV and an image formation apparatus MFP are configured to allow data communication with each other via a network NW. Network NW includes a dedicated line such as a LAN (Local Area Network) or WAN (Wide Area Network), and/or a public line such as the Internet or Virtual Private Network. Network may be partially or wholly a wireless communication line such as a wireless LAN.

Image formation apparatus MFP extracts data (for example, Web page) stored in Web server SRV in response to an operation made by the user. Specifically, image formation apparatus MFP transmits a request to fetch data to Web server SRV. Image formation apparatus MFP carries out a display process and/or image formation process based on the data from Web server SRV. The image formation process includes printing onto a paper sheet, transmission via facsimile, and the like.

Image formation apparatus MFP of the present embodiment is configured to enable connection with a plurality of Web servers SRV via a network NW including the Internet. Each Web server is assigned a predetermined address to specify a Web server SRV. Web server SRV stores various Web pages including image data, text data, and the like. Further, each Web page is assigned a predetermined address (URL). Web server SRV responds to a request from image formation apparatus MFP to call up a Web page of a specified address and transmit the relevant Web page to that image formation apparatus MFP.

Image formation apparatus MFP includes a Web browser as an application to request a Web server SRV of a Web page. Image formation apparatus MFP uses the Web browser to download a Web page from Web server SRV. Image formation apparatus MFP displays or prints out a downloaded Web page.

Specifically, image formation apparatus MFP of the present embodiment includes a first extraction unit 100A, a second extraction unit 100B, a fetch unit 100C, a first generation unit 100D, a second generation unit 100E, an output unit 100H, and functions thereof. Second generation unit 100E includes a grouping unit 100F, an append unit 100G, and a third extraction unit 100J.

As described before, image formation apparatus MFP includes scanner 112, communication interface 122, S-RAM 104, display 138, and printer 116.

First extraction unit 100A, second extraction unit 100B, fetch unit 100C, first generation unit 100D, second generation unit 100E, grouping unit 100F, append unit 100G, third extraction unit 100J and output unit 100H are implemented by CPU 100 reading out a program that is prestored in ROM 102, hard disk 110, or the like into S-RAM 104 and executing the relevant program. In other words, first extraction unit 100A, second extraction unit 100B, fetch unit 100C, first generation unit 100D, second generation unit 100E, grouping unit 100F, append unit 100G, third extraction unit 100J and output unit 100H constitute a unit (module) to implement the functions of CPU 100 in image formation apparatus MFP.

Scanner 112 scans a document to obtain a document image. Scanner 112 transfers the document image to first extraction unit 100A. Specifically, scanner 112 stores the document image (image data) in S-RAM 104. Scanner 112 reads out a plurality of documents, and obtains a document image corresponding to each of the plurality of documents.

Figure 3A:
FIGS. 3A-3C represent images of a first document sheet (document page 1), a second document sheet (document page 2), and a third document sheet (document page 3) read out by a scanner.
Figure 3B:
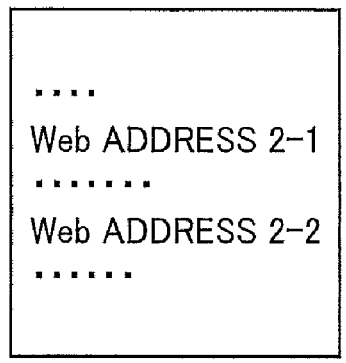
Figure 3C:
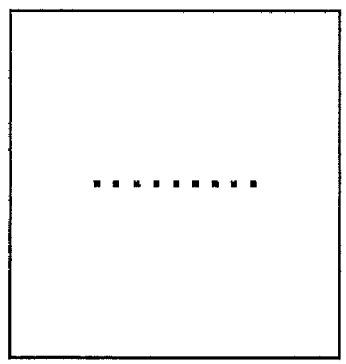
Figure 4:
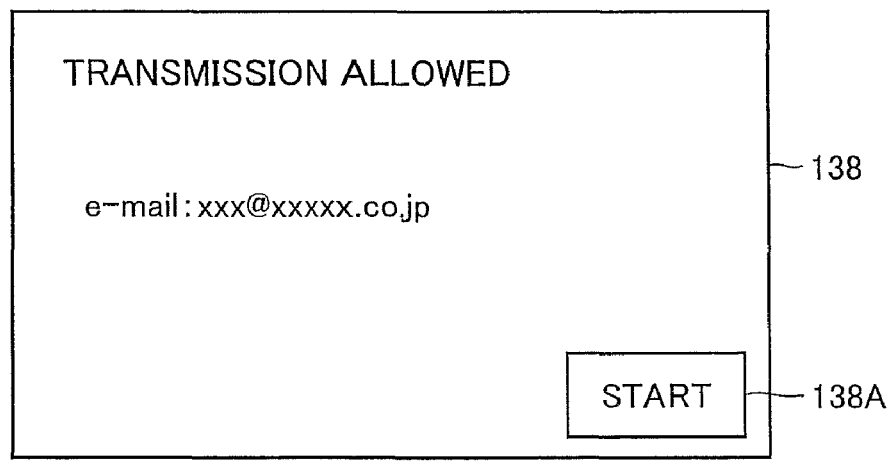
FIG. 4 represents an image of a display (operation panel) in a standby state for an instruction to scan a document at an image formation apparatus MFP.

FIG. 3A represents an image of the first document sheet (document page 1) read out by scanner 112. FIG. 3B represents an image of a second document sheet (document page 2) read out by scanner 112. FIG. 3C represents an image of a third document sheet (document page 3) read out by scanner 112. FIG. 4 represents an image of a display 138 (operation panel 114) in a standby state for receiving an instruction to scan a document at image formation apparatus MFP.

Referring to FIG. 4, there is a start button 138A on display 138 to accept a document scan instruction from a user. In response to a depression of start button 138A, scanner 112 sequentially reads out a plurality of documents, as shown in FIGS. 3A, 3B and 3C, and stores document images corresponding to these documents in S-RAM 104.

Returning to FIG. 2, first extraction unit 100A extracts text from the document image. First extraction unit 100A is implemented by an OCR (Optical Character Recognition) application or the like executed by CPU 100. CPU 100 functioning as first extraction unit 100A extracts all the characters (text) included in the document image based on the document image (image data) stored in S-RAM 104. First extraction unit 100A stores the extracted character data (text data) in S-RAM 104.

Second extraction unit 100B extracts a Web address contained in the document image based on the text data stored in S-RAM 104. Specifically, second extraction unit 100B stores data indicated a Web address in S-RAM 104. In the case where the document image includes a plurality of Web addresses, second extraction unit 100B extracts a plurality of Web addresses from the document image.

Specifically, second extraction unit 100B extracts text containing the character stream of "http://", "https://", or the like to store the relevant text as a Web address.

Fetch unit 100C uses the Web browser to obtain a Web page from Web server SRV based on a Web address. More specifically, fetch unit 100C causes communication interface 122 to receive a Web page from Web server SRV via network NW. Fetch unit 100C stores the Web page in correspondence with the document image in S-RAM 104.

In the case where a plurality of Web addresses are contained in one document image, fetch unit 100C obtains a plurality of Web pages corresponding to each of the plurality of Web addresses via communication interface 122. Accordingly, the user no longer has to enter an address upon activating a Web browser for the purpose of confirming the content of a Web page corresponding to a Web address cited in the document. In other words, the trouble to enter an address can be eliminated.

Figure 5:
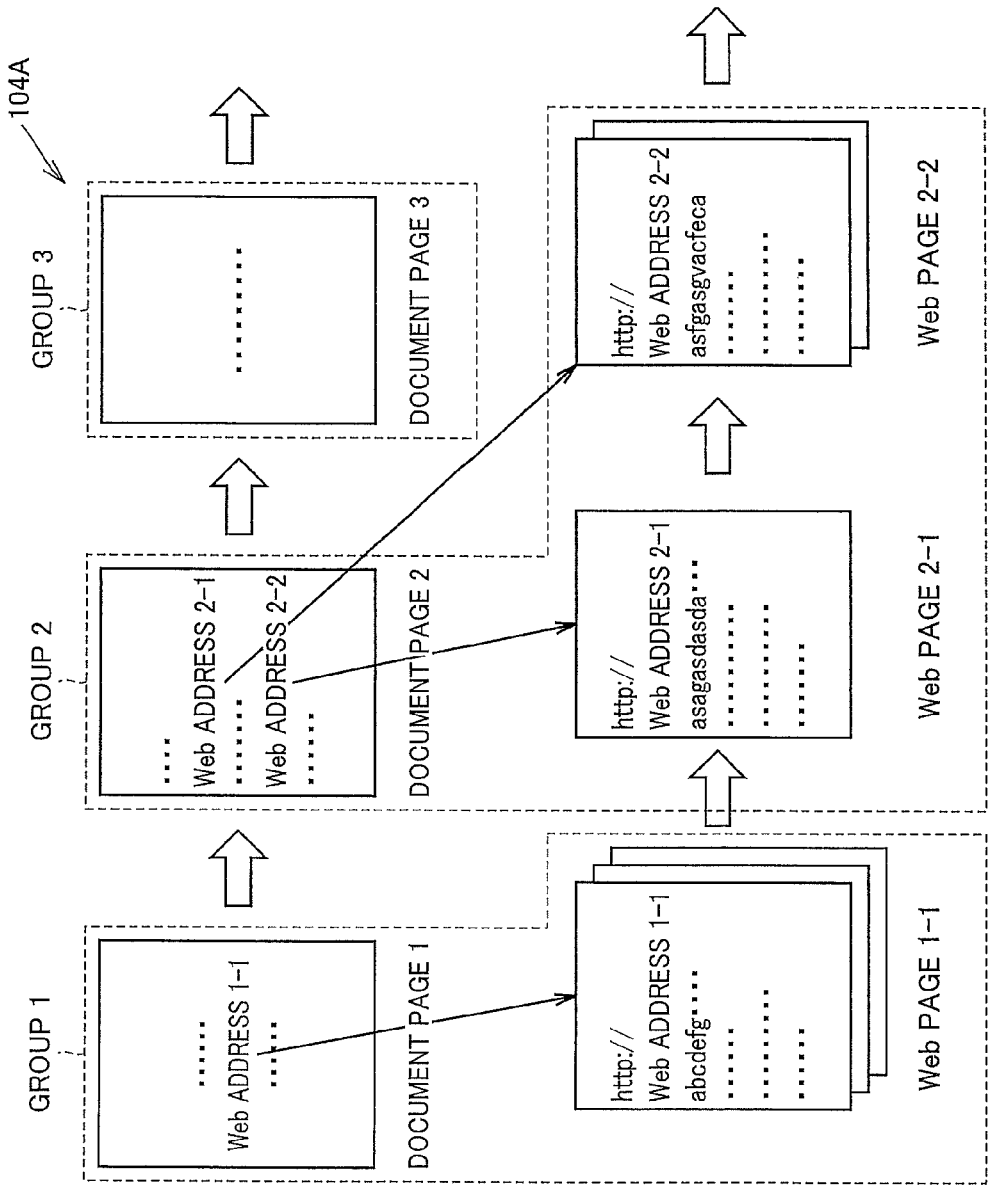
FIG. 5 represents an image indicating the relationship between document images and Web pages stored in an S-RAM (Static-Random Access Memory).

FIG. 5 represents an image indicating the relationship between document images and Web pages stored in S-RAM 104, As shown in FIG. 5, S-RAM 104 stores the document image of document page 1, the document image of document page 2, the document image of document page 3 read out by scanner 112, as well as Web page 1-1, Web page 2-1, and Web page 2-2 obtained by fetch unit 100C.

Returning to FIG. 2, first generation unit 100D reads out a document image and Web page from S-RAM 104 and concatenates the same. For example, first generation unit 100D reads out the file of all document images and the file of all Web pages from S-RAM 104, and concatenates the same into one image file. Namely, first generation unit 100D concatenates document images and Web pages to generate a concatenated image 104A including data thereof, and stores concatenated image 104A in S-RAM 104.

As used herein, a Web page includes image data representing the content of a Web page to be displayed. Alternatively, a Web page includes image data used by printer 116 and/or printer controller 118 when the content of the Web page are to be printed out. Alternatively, a Web page includes image data corresponding to an image of html data representing the content of a Web page, and may be PDF (Portable Document Format) data, for example.

In the case where there is one Web address in a document image of one page, first generation unit 100D generates a concatenated image 104A in which a document image of one page and a Web page or Web pages corresponding to one Web address are linked in series. In the case where there are a plurality of Web addresses in one document image page, first generation unit 100D generates a concatenated image 104A in which a document image of one page and all Web pages corresponding to each of the plurality of Web addresses are linked in series.

Returning to FIG. 5, first generation unit 100D generates concatenated image 104A in which images of the document image of document page 1, the document image of document page 2, the document image of document page 3, Web page 1-1, Web page 2-1, and Web page 2-2 are sequentially aligned.

Returning to FIG. 2, second generation unit 100E generates an index 104B corresponding to concatenated image 104A. Index 104B represents the corresponding relationship between respective document images and respective Web pages. More specifically, second generation unit 100E generates, based on document images and Web pages, index 104B corresponding to concatenated image 104A in which relevant document images and Web pages are linked together in a series. Second generation unit 104E stores index 104 in S-RAM 104.

FIG. 6 represents an image of display 138 showing index 104B generated by second generation unit 100E. Referring to FIG. 6, index 104B includes an item (title) corresponding to each of a plurality of document images and an item (title) corresponding to each of a plurality of Web pages. Index 104B also includes the starting page of the concatenated image of respective document images, and the starting page of the concatenated image of respective Web pages.

As shown in FIGS. 2, 5 and 6, grouping unit 100F sorts each of a plurality of Web pages into a corresponding group for every document image. Append unit 100G appends information indicating a corresponding group to each item included in index 104B.

Specifically, grouping unit 100F stores into S-RAM 104 the document image of document page 1 and Web page 1-1 in association with the corresponding document image as group 1. Grouping unit 100F organizes as one group the document image of document page 1 and Web pages corresponding to each Web address included in document page 1. Grouping unit 100F stores into S-RAM 104 the document image of document page 2 and Web pages 2-1 and 2-2 in association with the corresponding document image as group 2. Grouping unit 100F stores into S-RAM 104 the document image of document page 3 as group 3.

A predetermined color is set for each group. Append unit 100G appends a predetermined color set for each group to the corresponding item included in index 104B. For example, append unit 100G appends the red color to items corresponding to group 1, i.e. the item indicating the document image of document page 1 and the item indicating Web page 1-1 in association with the corresponding document image. Append unit 100G appends the green color to items corresponding to group 2, i.e. the item indicating the document image of document page 2 as well as the item indicating Web page 2-1 and the item indicating Web page 2-2 in association with the corresponding document image. Append unit 100G appends the blue color to the item corresponding to group 3, i.e. the item indicating the document image of document page 3.

Output unit 100H outputs index 104B with the color of the corresponding group applied to each of the items included in index 104B. Output unit 100H causes concatenated image 104A, and/or index 104B with the color of the corresponding group applied to each of the items included in index 104B, and the like to be displayed at display 138, or printed out at printer 116.

This assists the user in identifying the corresponding relationship between document images and Web pages when Web pages corresponding to Web addresses appearing on the documents are obtained. Namely, the user can readily identify which Web page corresponds to a Web address appearing on a certain document after Web pages are obtained, stored, or printed.

<Modification of Index>

FIG. 7 represents an image of a modified example of display 138 showing index 104B generated by second generation unit 100E.

Referring to FIGS. 2 and 7, a predetermined mark is set for each group. Append unit 100G appends a predetermined mark set for a corresponding group to each item included in index 104B. For example, append unit 100G appends a star mark to items corresponding to group 1, i.e. the item indicating the document image of document page 1 and the item indicating Web page 1-1 in association with the corresponding document image. Append unit 100G appends a square mark to items corresponding to group 2, i.e. the item indicating the document image of document page 2 as well as the item indicating Web page 2-1 and the item indicating Web page 2-2 in association with the corresponding document image. Append unit 100G appends a circle mark to the item corresponding to group 3, i.e. the item indicating the document image of document page 3.

Output unit 100H outputs index 104B with the mark of a corresponding group applied to each of the items included in index 104B. Output unit 100H causes index 104B with the mark of a corresponding group applied to each of the items included in index 104B to be displayed at display 138, or printed out at printer 116.

<Sorting Function>

Figure 8:
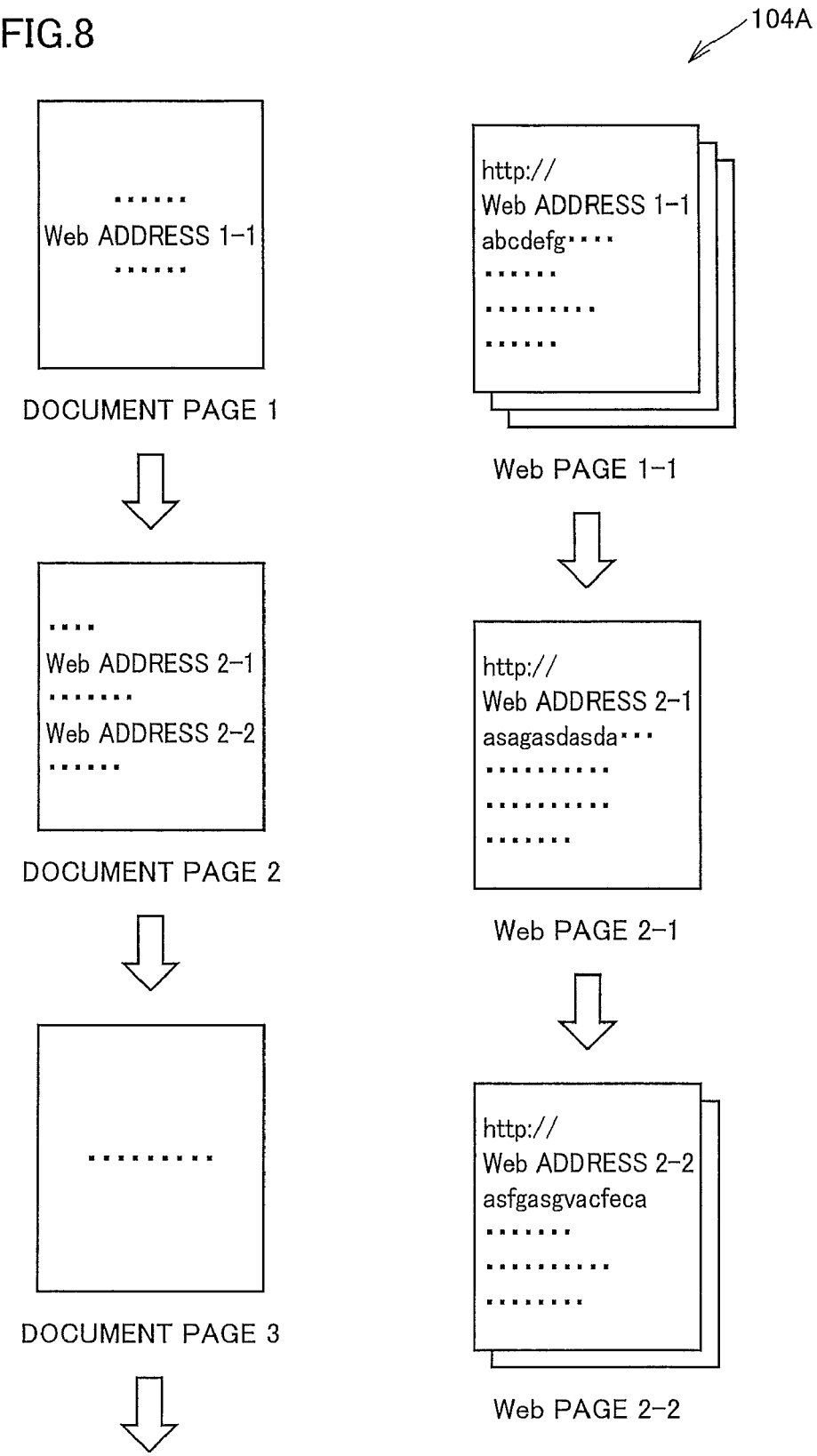
FIG. 8 represents an image of a pre-sort concatenated image, generated by a first generation unit.
Figure 9:
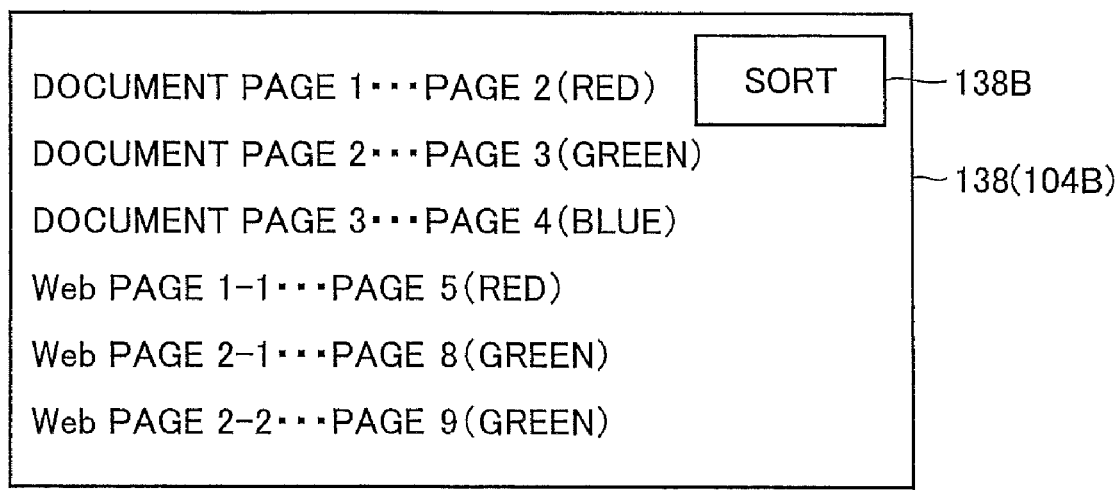
FIG. 9 represents an image of a display of a pre-sort index, generated by the second generation unit.

Second generation unit 100E according to the present embodiment generates index 104B in a state allowing the items included in index 104B to be sorted according to groups. FIG. 8 represents an image of a pre-sort concatenated image 104A, generated by first generation unit 100D, FIG. 9 represents an image of display 138 where a pre-sort index 104B, generated by second generation unit 100E, is shown.

Referring to FIGS. 2 and 8, first generation unit 100D generates a pre-sort concatenated image 104A, in which the document image of document page 1, the document image of document page 2, the document image of document page 3, Web page 1-1, Web page 2-1 and Web page 2-2 are sequentially arranged. Referring to FIGS. 2 and 9, second generation unit 100E generates index 104B corresponding to pre-sort concatenated image 104A. At this stage, display 138 shows a sort button 138B.

Figure 10:
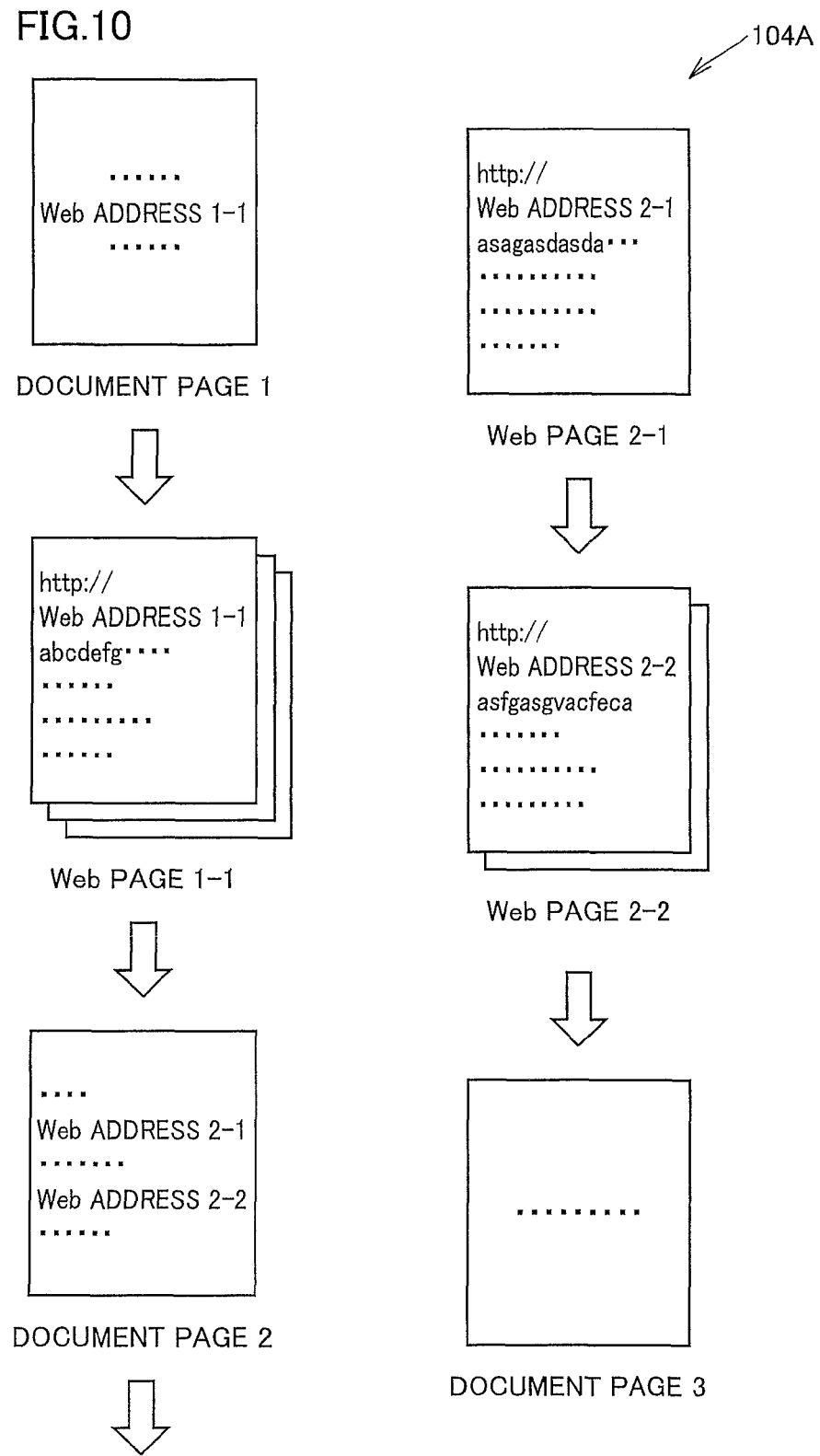
FIG. 10 represents an image of a post-sort concatenated image, generated by the first generation unit.
Figure 11:
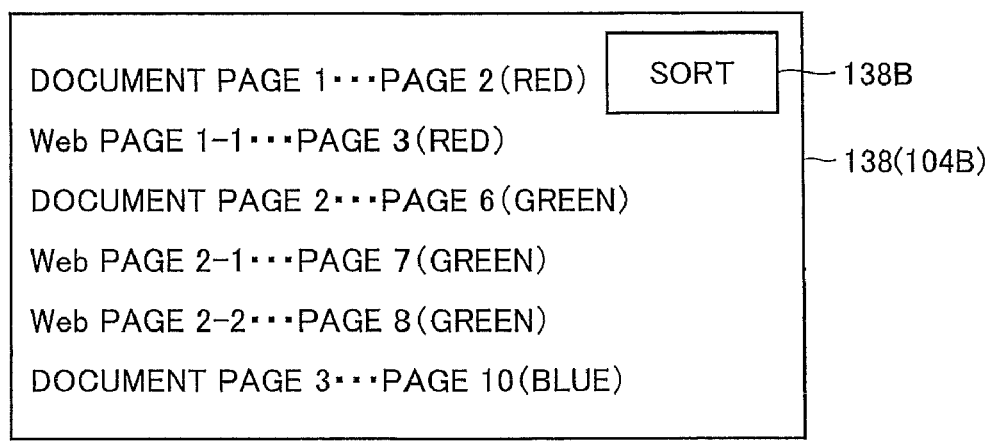
FIG. 11 represents an image of a display of a post-sort index, generated by the second generation unit.

FIG. 10 represents an image of post-sort concatenated image 104A, generated by first generation unit 100D, FIG. 11 represents an image of display 138 where post-sort index 104B, generated by second generation unit 100E, is displayed.

In response to depression of sort button 138B by a user, first generation unit 100D generates a post-sort concatenated image 104A in which the document image of document page 1, Web page 1-1, the document image of document page 2, Web page 2-1, Web page 2-2, and the document image of document page 3 are sequentially arranged, as shown in FIGS. 2 and 10. Then, second generation unit 100E generates index 104B corresponding to post-sort concatenated image 104A, as shown in FIGS. 2 and 11. Sort button 138B appears at display 138.

When sort button 138B is depressed again by the user, first generation unit 100D and second generation unit 100E update concatenated image 104A by redoing the sorting of the document images and Web pages. Index 104B returns to the former state.

<Item Extraction Function>

Figure 12:
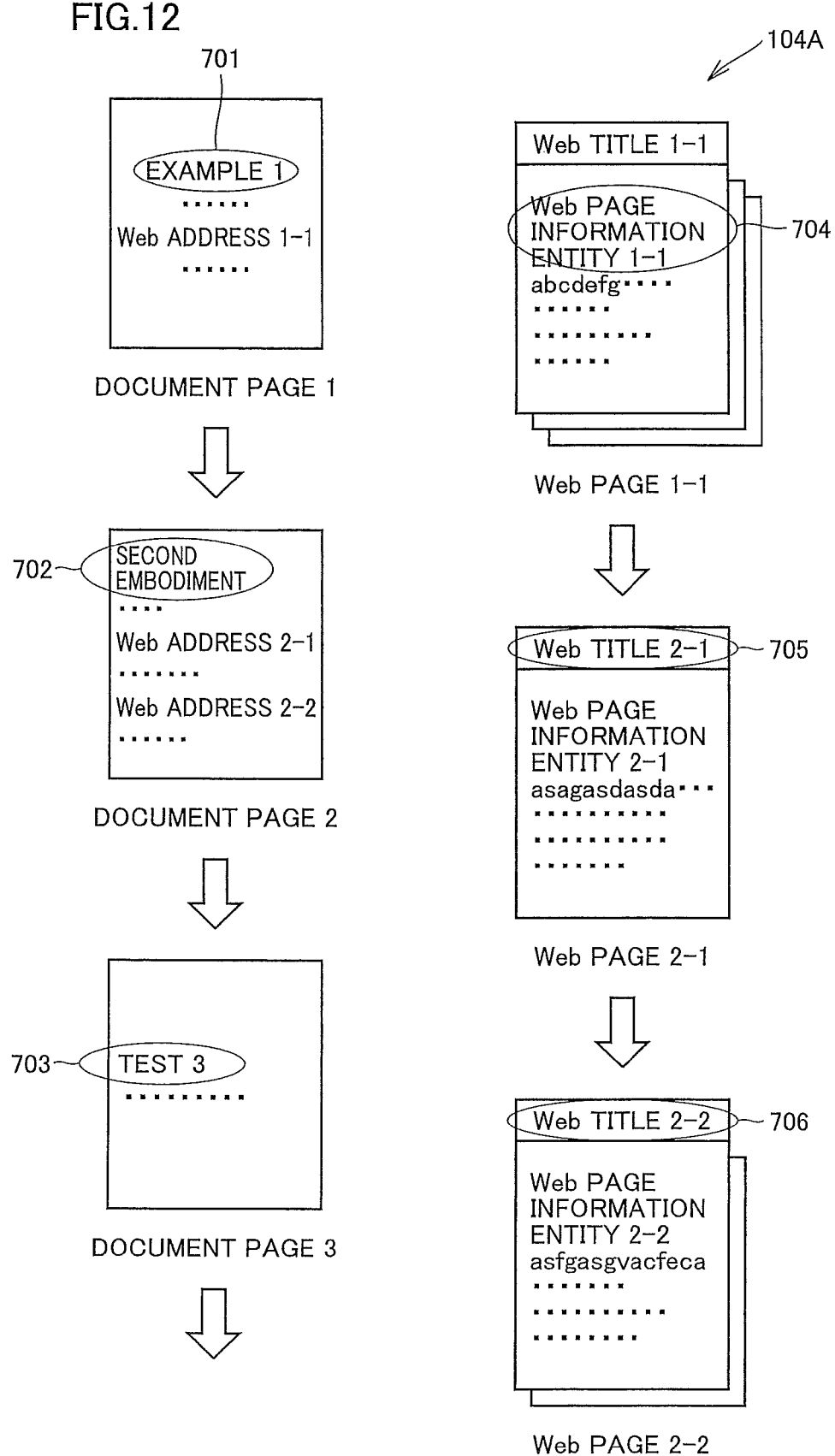
FIG. 12 represents an image of a modified example of a pre-sort concatenated image, generated by the first generation unit.

FIG. 12 represents an image of a modified example of a pre-sort concatenated image 104A, generated by first generation unit 100D. FIG. 13 represents an image of display 138 showing a modified example of pre-sort index 104B, generated by second generation unit 100E.

As shown in FIGS. 2 and 12, third extraction unit 100J extracts the headings 701, 702 and 703 (text data) of a corresponding document from each document image. Specifically, third extraction unit 100J stores headings 701, 702 and 703 in S-RAM 104 as the title of the document image. In this context, third extraction unit 100J may extract a plurality of characters from the beginning of a corresponding document with respect to each document image.

Third extraction unit 100J extracts a heading 704 or Web addresses 705 and 706 of each Web page. Specifically, third extraction unit 100J stores heading 704 and/or Web addresses 705 and 706 in S-RAM 104 as the title of a Web page. In this context, third extraction unit 100J may extract the heading of each Web page or a plurality of characters from the beginning of a Web address.

As shown in FIGS. 2 and 13, append unit 100G appends the heading of a document stored in S-RAM 104 to index 104B as the item name (title) of a corresponding document image. In addition, append unit 100G appends a heading of a Web page or a Web address to index 104B as the item name (title) of a corresponding Web page.

<Image Concatenation Process>

An image concatenation process at image formation apparatus MFP according to the present embodiment will be described hereinafter with reference to the flowchart of FIG. 14.

Figure 14:
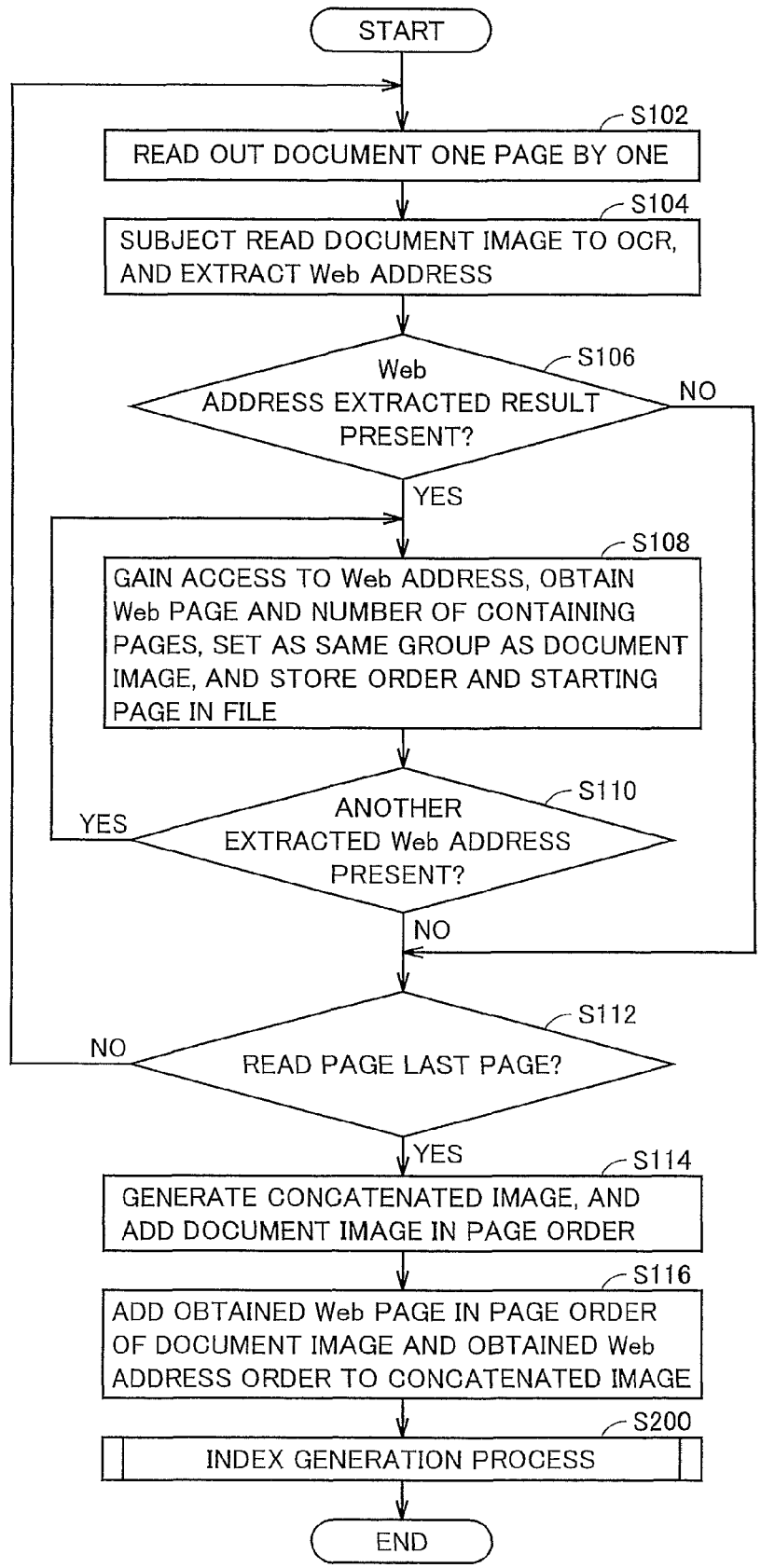
FIG. 14 is a flowchart of the procedure of an image concatenating process at an image formation apparatus MFP according to an embodiment.

Referring to FIG. 14, depression of start button 138A by a user, i.e. reception of a scan start instruction at CPU 100, causes scanner 112 to read out each document one by one (step S102). CPU 100 utilizes an OCR application or the like to extract a Web address from the scanned document image, and stores the Web address in S-RAM 104 (step S104). Specifically, generation of a group for every document image causes CPU 100 to store the group information for every document image into S-RAM 104. Each group information includes a Web address contained in a corresponding document image.

Then, CPU 100 determines whether a Web address extracted result is stored in S-RAM 104 or not (step S106). In the case where a Web address extracted result is not stored in S-RAM 104 (NO at step S106), control proceeds to step S112.

In contrast, when a Web address extracted result is stored in S-RAM 104 (YES at step S106), CPU 100 gains access to the Web address via communication interface 122 to obtain a Web page (step S108). At this stage, CPU 100 obtains the number of pages when Web pages are to be printed out, or the number of pages when the Web page is converted into PDF data or the like.

Moreover, CPU 100 stores in S-RAM 104 the document image, and the Web page corresponding to the Web address appearing in the relevant document image as the same one group. At this stage, CPU 100 stores the order of the document images and order of the Web pages into S-RAM 104.

CPU 100 determines whether there is another extracted Web address stored in S-RAM 104 (step S110). When another extracted Web address is stored in S-RAM 104 (YES at step S110), CPU 100 repeats the process from step S108.

When there is not another extracted Web address stored in S-RAM 104 (NO at step S110), or when an extracted result of a Web address is not stored in S-RAM 104 (NO at step S106), CPU 100 determines whether the read document is the last page or not (step S112). When the read document is not the last page (NO at step S112), CPU 100 repeats the process from step S102.

In contrast, when the read document is the last page (YES at step S112), CPU 100 generates a new concatenated file, and applies the document image to the concatenation file in the read order (step S114). CPU 100 appends the Web page corresponding to the document image to the concatenation file in the read order of the document images (step S116).

CPU 100 executes an index generation process (step S200), which will be described afterwards. When the index generation process is completed, CPU 100 ends the image concatenation process.

<Index Generation Process>

An index generation process at image formation apparatus MFP of the present embodiment will be described hereinafter with reference to the flowchart of FIG. 15.

Figure 15:
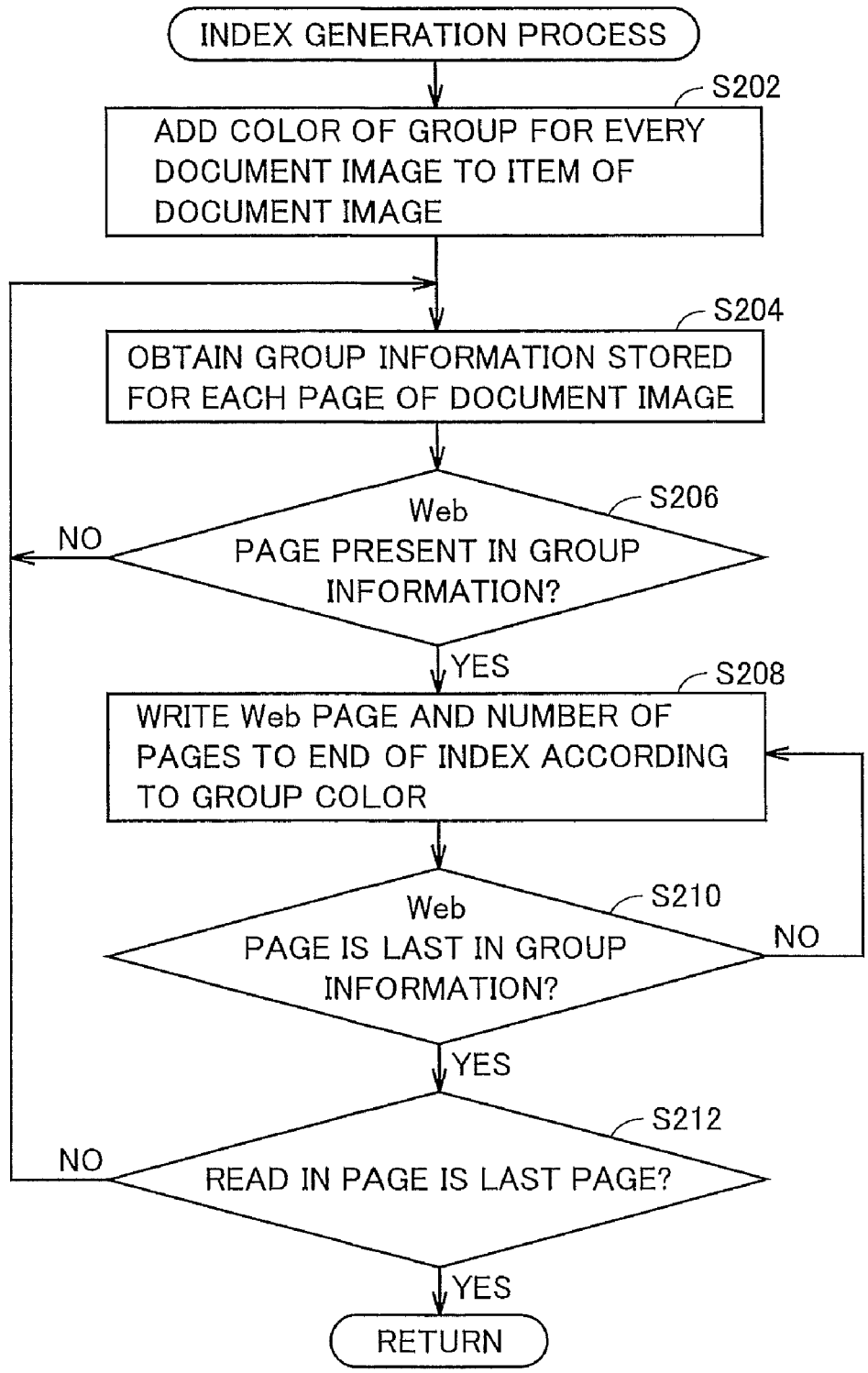
FIG. 15 is a flowchart of the procedure of an index generation process at an image formation apparatus MFP according to an embodiment.

Referring to FIG. 15, upon completion of a concatenation file (step S116 in FIG. 14), CPU 100 appends a color (or mark) corresponding to a group to each corresponding item in the document image (step S202). CPU 100 reads out the group information stored in S-RAM 104 for every document image (step S204).

CPU 100 determines whether a Web address is contained in the target group information (step S206). When a Web address is not contained in the target group information (NO at step S206), CPU 100 repeats the process from step S204.

When a Web address is contained in the target group information (YES at step S206), CPU 100 adds an item (title name or the like) corresponding to each Web page and the number of corresponding pages to the end of index 104B (step S208). At this stage, CPU 100 adds such information into index 104B with the color of a corresponding group applied to the item (title name or the like) corresponding to each Web page and a corresponding starting page (or number of pages).

CPU 100 determines whether the added Web page is the last Web page in the group information (step S210). When the added Web page is not the last Web page in the group information (NO at step S210), CPU 100 repeats the process from step S208.

In contrast, when the added Web page is the last Web page in the group information (YES at step S210), CPU 100 determines whether the subject group information corresponds to the last page of the read document (step S212). When the subject group information does not correspond to the last page of the read document (NO at step S212), CPU 100 repeats the process from the step S204.

In contrast, when the subject group information corresponds to the last page of the read document (YES at step S202), CPU 100 ends the index generation process (step S200).

Other Embodiment

The program according to the present invention may call up, at a predetermined timing in a predetermined array, a required one of program modules presented as a part of a computer operating system (OS) for execution. In this case, the program itself is not contained in the aforementioned module, and the process is executed in cooperation with the OS. Such a program that does not contain a module may be included in the program of the present invention.

The program of the present invention may be incorporated as a part of another program to be presented. In this case, the program itself is not contained in the module that is present in the aforementioned another program, and the process is executed in cooperation with the another program. Such a program incorporated in another program may be included in the program of the present invention.

The presented program product is installed in a program storage unit such as a hard disk for execution. The program product includes a program per se, and a storage medium in which the program is stored. The recording medium includes, not only the aforementioned ROM 102, S-RAM 104, and NV-RAM 106, but also an USB (Universal Serial Bus) memory, memory card, FD (Flexible Disk), hard disk, magnetic tape, cassette tape, MO (Magnetic Optical Disc), MD (Mini Disc), DVD (Digital Versatile Disc), CD (Compact Disc), IC (Integrated Circuit) card, optical card, mask ROM, EPROM (Erasable Programmable Read Only Memory), EEPROM (Electronically Erasable Programmable Read-Only Memory), flash ROM, and the like.

Further, a portion or all of the functions realized by the program of the present invention may be configured by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus including a Web browser, capable of obtaining Web page information through a network comprising:
   a scanner for obtaining document images by reading out each of a plurality of documents on which text including a Web address is indicated,
   a first extraction unit for extracting said text from said document images,
   a second extraction unit for extracting said Web address from said text,
   a fetch unit for fetching Web page information corresponding to each said Web address utilizing said Web browser,
   a first generation unit for generating one concatenated image by concatenating said document images and an image indicated by said Web page information, and
   a second generation unit for generating an index indicating a corresponding relationship between said document images and said Web page information in said concatenated image.

2. The image processing apparatus according to claim 1, wherein said index includes items corresponding to each of said plurality of document images and each of said plurality of Web pages information.

3. The image processing apparatus according to claim 2, wherein said second generation unit comprises:
   a grouping unit for classifying each said Web page information into groups for every said document image, and
   a appending unit for appending information indicating the corresponding group to each said item in said index.

4. The image processing apparatus according to claim 3, wherein a predetermined color is set for each group, and
   said image processing apparatus further comprising an output unit for applying the color of the corresponding group to each item, and outputting said index.

5. The image processing apparatus according to claim 3, wherein a predetermined mark is set for each group,
   said image processing apparatus further comprising an output unit for applying the mark of the corresponding group to each said item, and outputting said index.

6. The image processing apparatus according to claim 3, wherein a predetermined color is set for each group, and
   said appending unit has a predetermined color set for corresponding said group to each said item included in said index.

7. The image processing apparatus according to claim 3, wherein
   a predetermined mark is set for each said group, and
   said appending unit appends the predetermined mark set for the corresponding group to each said item in said index.

8. The image processing apparatus according to claim 3, wherein said second generation unit generates said index to allow said items to be sorted based on said groups.

9. The image processing apparatus according to claim 3, further comprising a third extraction unit for extracting a heading of each document,
   wherein said appending unit appends the heading of each said document to said index as an item name of the corresponding document image.

10. The image processing apparatus according to claim 3, wherein said appending unit appends each said Web address to said index as the item of the corresponding Web page.

11. An image processing apparatus including a Web browser, capable of obtaining Web page information through a network, comprising:
    a scanner for obtaining document images by reading out each of a plurality of documents on which text including a Web address is indicated,
    first extraction unit for extracting said text from said document images,
    second extraction unit for extracting said Web address from said text,
    fetch unit for fetching Web page information corresponding to each said Web address, utilizing said Web browser,
    first generation unit for generating one concatenated image by concatenating said document images and an image indicated by said Web page information,
    second generation unit for generating an index indicating a corresponding relationship between said document images and said Web page information in said concatenated image, and
    image formation unit for printing out said concatenated image or said index.

12. An index generation method for an image processing apparatus including a Web browser, said image processing apparatus including:
    a processing unit controlling each element of said image processing apparatus, and
    a scanner for obtaining document images by reading out each of a plurality of documents on which text including a Web address is indicated,
    said index generation method comprising the steps of:
    extracting said text from said document images, by said processing unit;
    extracting said Web address from the text, by said processing unit;
    obtaining Web page information corresponding to each said Web utilizing said Web browser, by said processing unit;
    generating one concatenated image by concatenating said document images with an image indicated by said Web page information, by said processing unit; and generating an index indicating a corresponding relationship between the document images and said Web page information in said concatenated image, by said the processing unit.

13. The index generation method according to claim 12, wherein said index includes items corresponding to each of said plurality of document images and each of said plurality of Web pages information.

14. The index generation method according to claim 13, further comprising:
    classifying each said Web page information into groups for every said document image, and
    appending, by an appending unit of said second generation unit, information indicating the corresponding group to each said item in said index.

15. The index generation method according to claim 14, wherein a predetermined color is set for each group, said method further comprising:
    applying the color of the corresponding group to each item and outputting said index.

16. The index generation method according to claim 14, wherein a predetermined mark is set for each group, said method further comprising:
    applying the mark of the corresponding group to each said item and outputting said index.

17. The index generation method according to claim 14, wherein a predetermined color is set for each group, said method further comprising:
    setting a predetermined color for corresponding said group to each said item included in said index.

18. The index generation method according to claim 14, wherein a predetermined mark is set for each group, said method further comprising:
    appending, by said appending unit, the predetermined mark set for the corresponding group to each said item in said index.

19. The index generation method according to claim 14, further comprising:
    generating said index to allow said items to be sorted based on said groups.

20. The index generation method according to claim 14, further comprising:
    extracting a heading of each document, wherein in said appending step, the heading of each said document to said index as an item name of the corresponding document image.

21. The index generation method according to claim 14, further comprising:
    appending each said Web address to said index as the item of the corresponding Web page.

22. A non-transitory computer-readable recording medium having a program stored thereon that causes an image processing apparatus including a Web browser to generate an index, said image processing apparatus including
    a processing unit controlling each element of said image processing apparatus, and
    a scanner for obtaining document images by reading out each of a plurality of documents on which text including a Web address is indicated,
    said index generation program causing said processing unit to execute the steps of:
    extracting said text from said document images,
    extracting said Web address from said text, by said processing unit,
    obtaining Web page information corresponding to each said Web address utilizing said Web browser,
    generating one concatenated image by concatenating said document images with an image indicated by said Web page information, and
    generating an index indicating a corresponding relationship between the document images and said Web page information in said concatenated image.

\* \* \* \* \*